(12) United States Patent
Wampler et al.

(10) Patent No.: US 9,874,398 B1
(45) Date of Patent: Jan. 23, 2018

(54) SELF-SUPPORTING DRYING SYSTEM AND METHOD

(71) Applicants: Jonathan Wampler, Newark, DE (US); Priscilla Hill-Wampler, Newark, DE (US)

(72) Inventors: Jonathan Wampler, Newark, DE (US); Priscilla Hill-Wampler, Newark, DE (US)

(*) Notice: Subject to any disclaimer, the term of this patent is extended or adjusted under 35 U.S.C. 154(b) by 308 days.

(21) Appl. No.: 14/676,619

(22) Filed: Apr. 1, 2015

(51) Int. Cl.
*F26B 5/00* (2006.01)
*F26B 21/00* (2006.01)
*F26B 25/06* (2006.01)

(52) U.S. Cl.
CPC .............. *F26B 21/004* (2013.01); *F26B 5/00* (2013.01); *F26B 25/06* (2013.01)

(58) Field of Classification Search
CPC .................................. F26B 21/004; F26B 5/00
USPC .............. 34/283, 443, 487, 488, 492, 96, 97
See application file for complete search history.

(56) References Cited

U.S. PATENT DOCUMENTS

| | | | | |
|---|---|---|---|---|
| 5,279,048 A | * | 1/1994 | Lawall .................... | A45D 20/12 34/90 |
| 5,651,190 A | | 7/1997 | Sanders | |
| 6,024,464 A | * | 2/2000 | De Vera .................... | A45B 3/04 224/190 |
| 7,096,597 B1 | * | 8/2006 | Zellous ................... | A45D 20/18 34/90 |
| 2009/0038283 A1 | * | 2/2009 | Hurley ................. | A01D 34/902 56/12.7 |
| 2009/0184143 A1 | * | 7/2009 | Witt ....................... | A45C 7/0059 224/153 |
| 2012/0305036 A1 | * | 12/2012 | Lach ................. | H01L 21/67051 134/137 |
| 2014/0007370 A1 | * | 1/2014 | Thackery ............... | A01G 1/125 15/327.5 |
| 2016/0113207 A1 | * | 4/2016 | Shumaker ................. | B08B 5/02 15/405 |

FOREIGN PATENT DOCUMENTS

| | | |
|---|---|---|
| EP | 1834540 A1 | 9/2007 |
| FR | 2607684 A1 | 6/1988 |

* cited by examiner

*Primary Examiner* — John McCormack
(74) *Attorney, Agent, or Firm* — Mintz Levin Cohn Ferris Glovsky and Popeo, P.C.

(57) ABSTRACT

A hands-free dryer allows for drying of a target while permitting the hands of a user to not be controlling the operation of the hands-free dryer. The hands-free dryer includes a blower for providing air flow, an orientation system allowing the blower to be adjustably oriented at an angle. There is a semi-rigid flexible hose connected to the blower that retains its configuration without the user having to maintain the configuration. Also, there is a support system that provides support for the hands-free dryer while worn by the user.

12 Claims, 5 Drawing Sheets

SELF-SUPPORTING DRYING SYSTEM AND METHOD

TECHNICAL FIELD

The subject matter described herein relates to the drying of targets such as persons or animals with powered mechanical dryers.

BACKGROUND

The drying of targets such as persons and animals often coincides with grooming activities. Typically grooming and drying are done in alternating steps, where some drying is done, then some grooming, then more drying, etc. With animals, in addition to having the facility to dry/groom the animal, the animal must also be controlled. This can be done by hand or with restraints. With persons, a dryer can be held in one hand and a grooming tool in the other, to allow for simultaneous grooming and drying. Dryers used to dry persons or animals can be in the form of hand-held dryers, overhead driers, dryer gantries, etc.

SUMMARY

In one aspect, a hands-free dryer allows for drying of a target while permitting the hands of a user to not be controlling the operation of the hands-free dryer. The hands-free dryer includes a blower for providing air flow, an orientation system allowing the blower to be adjustably oriented at an angle. There is a semi-rigid flexible hose connected to the blower that retains its configuration without the user having to maintain the configuration. Also, there is a support system that provides support for the hands-free dryer while worn by the user.

In some variations one or more of the following features can optionally be included in any feasible combination.

In one implementation, the orientation system can include a mounting plate affixed to the support system, a rotating plate connected to the mounting plate, where the blower is mounted to the rotating plate to allow the blower to be rotated relative to the mounting plate through an adjustable angle.

In another implementation, the orientation system can include an index locking system for holding the blower at desired angle. The index locking system can include a fixed bracket with a fixed bracket aperture, a pivotal bracket connected to the fixed bracket and having an index peg that can be inserted into an index hole in the rotating plate. When the pivotal bracket pivots to insert the index peg into the index hole, the rotating plate will be unable to rotate and the blower will remain at the angle specified by the index hole.

In a further implementation, the rotating plate can include a plurality of index holes, where when the support system is worn by the user and the rotating plate is substantially vertical, that the index holes allow the angle of the rotating plate and the blower to cause the blower/semi-rigid flexible hose combination to point under the left arm, over the left shoulder, over the right shoulder, or under the right arm.

In yet another implementation, the support system can include a back section adjacent a back of the user when the support system is worn, and a harness connected to the back section, with the harness having a pair of shoulder straps and a pair of adjustable straps to adjust the shoulder straps. The support system can further include a chest strap connected between the shoulder straps to adjust the shoulder straps across a chest of the user. There can also be a waist strap connected to the back section to further secure the support system to the user. Also, there can be a carrying strap connected to the back section to allow the user to easily carry the hands-free dryer.

In another implementation, the blower can include a blower housing having a blower proximal end and a blower distal end, with a blower mechanism located within the blower housing and between the blower proximal end and the blower distal end. There can be a blower aperture located at the blower distal end providing an opening for air from the blower mechanism to leave the blower housing. There can be a power cable connected to the blower mechanism to provide power to operate the blower mechanism. There can also be blower controls connected to the blower mechanism to allow the user to operate the blower mechanism. Optionally, the blower controls can be located on the support system.

In a further implementation, the semi-rigid flexible hose can include a hose proximal end, a hose distal end, a hose proximal aperture at the hose proximal end to accept air into the semi-rigid flexible hose, a hose distal aperture located in the hose distal end to provide air flow from the blower to the target, and a hose fastener at the hose proximal end to fasten the hose proximal end to the blower. Furthermore the semi-rigid flexible hose can be a LOC-LINE brand hose.

In yet another implementation, the index locking system can include magnets connected to the mounting plate and to the support plate, where one of the magnets is a locking magnet and the other magnets are index magnets. The locking magnet can be connected to the mounting plate and the index magnets can be connected to the rotating plate, or vice versa. The polarity of the index magnet and the locking magnets can be arranged such that the attractive force between the magnets is maximized when at least one of the index magnets and the locking magnet are in closest proximity, the maximized attractive force then resists the rotation of the rotating plate.

In an interrelated aspect, a method for drying a target while allowing hands of a user to not be controlling the operation of the hands-free dryer includes wearing, by a user, of a hands-free dryer. The hands-free dryer has a blower for providing air flow, an orientation system connected to the blower configured to allow the blower to be adjustably oriented at an angle, a semi-rigid flexible hose operatively connected to the blower.

The user orients, using the orientation system, the blower to a desired position. The user configures, using the orientation system, the semi-rigid flexible hose to point to a target.

The user releases the semi-rigid flexible hose to leave the semi-rigid flexible hose self-supporting during operation of the hands-free dryer.

The user also initiates powering the hands-free dryer to provide directed air flow to the target through the semi-rigid flexible hose and without the user's hands controlling the semi-rigid flexible hose.

Implementations of the current subject matter can provide one or more advantages. For example, the hands-free dryer allows the use of a user's hands while providing a controlled and adjustable source of air for drying a target. The adjustable nature of the hands-free dryer allows it to be used by either left or right-handed users and to allow a wide variety of blowing angles for drying the target. While using the hands-free dryer, the user can groom or style the target, while controlling the targets during the grooming procedure. Also, while using the hands-free dryer, the user has nearly unencumbered mobility to work 360° around the target. The relative size and structure of the hands-free dryer permits portability and transportability. The user could, for example, work in different areas of a shop, travel to remote work sites, participate in various shows, competitions, conventions, demonstration displays, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a hands-free dryer, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter is directed to methods, systems, and apparatus, for drying of targets including inanimate objects and animate objects such as persons or animals. There are many applications in which a target needs to be dried while, at the same time, the operator of a dryer needs to undertake different activities. For example, the grooming and drying of persons, and particularly animals, can be challenging because often the person doing the grooming/drying must hold tools, as well as control the person/animal to be groomed and/or dried. Performing grooming and drying in steps can be difficult, slow, and lead to imprecise grooming, such as if the hair is over or under dried at a particular stage of grooming. Presented below is a hands-free dryer that allows a user to direct air flow to a target to be dried while leaving the user's hands free to control the target, groom the target, or both, and allows nearly unencumbered access to work 360° around the target. The user dons the hands-free dryer and positions a hose providing air flow to contact the target at the desired location. The hose remains in the proper position without further control from the user, allowing the user to undertake other activities.

Figure 1:
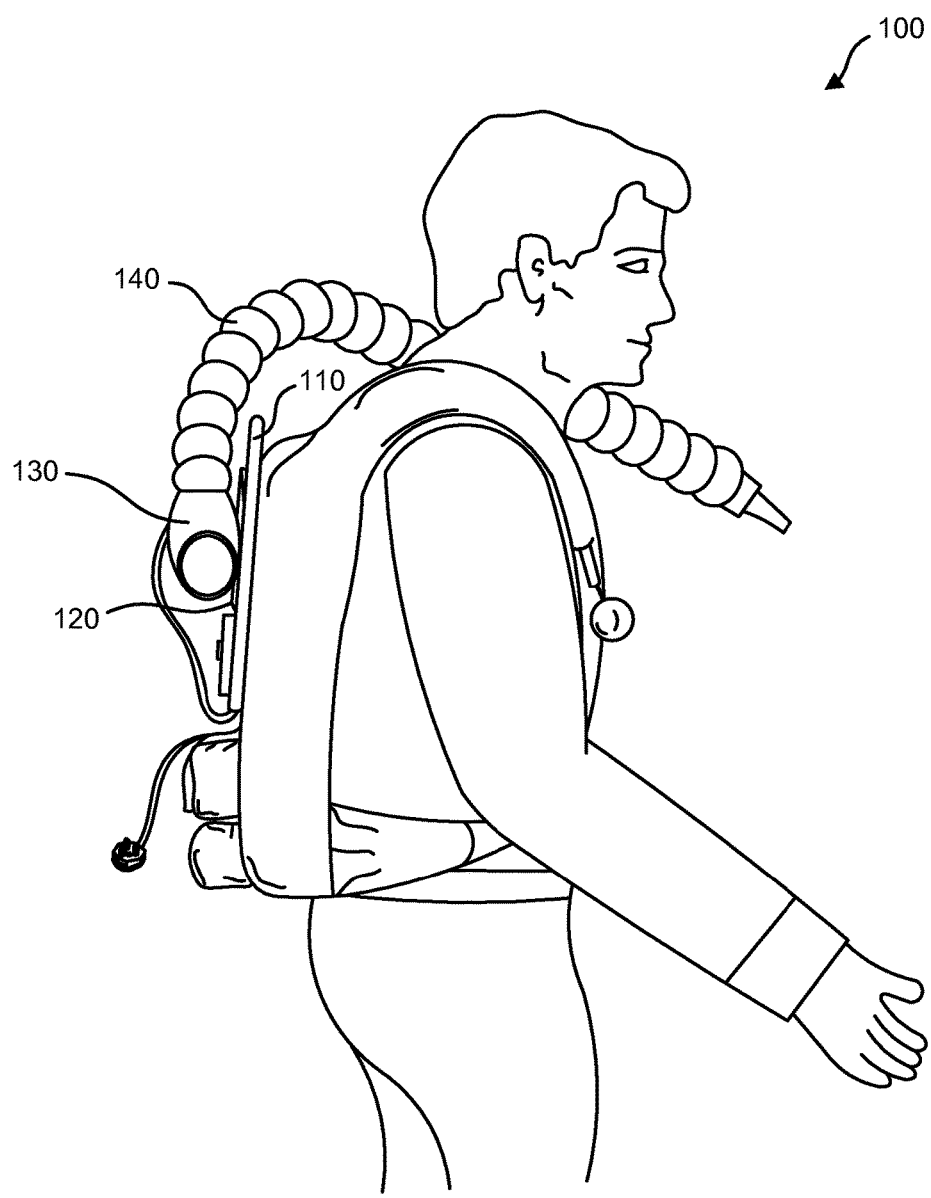
FIG. 1 is a perspective view of a user wearing a hands-free dryer.

FIG. 1 is a perspective view of a user wearing a hands-free dryer 100. In one implementation, the hands-free dryer 100 can include a support system 110 for attaching the hands-free dryer 100 to the user, an orientation system 120 to orient the hands-free dryer 100 when worn, a blower 130 to provide air flow, and a semi-rigid, flexible hose 140 to direct the air flow to the target. The user can control and groom the target while providing drying via the hands-free dryer 100.

The hands-free dryer 100 can provide two forms of adjustment. The blower 130 can be oriented by rotating the blower 130 on the user's back. As shown in FIG. 1, the orientation is illustrated to be over the user's left shoulder. The second form of adjustment is setting the configuration of the semi-rigid, flexible hose 140. The configuration, as used herein, is defined to refer to the bends, twists, positioning of the semi-rigid, flexible hose 140 such that the air coming from the semi-rigid, flexible hose 140 contacts the target at the desired location and/or angle A. The semi-rigid, flexible hose 140 can also be adjusted to be closer or further away from the target.

Figure 2:
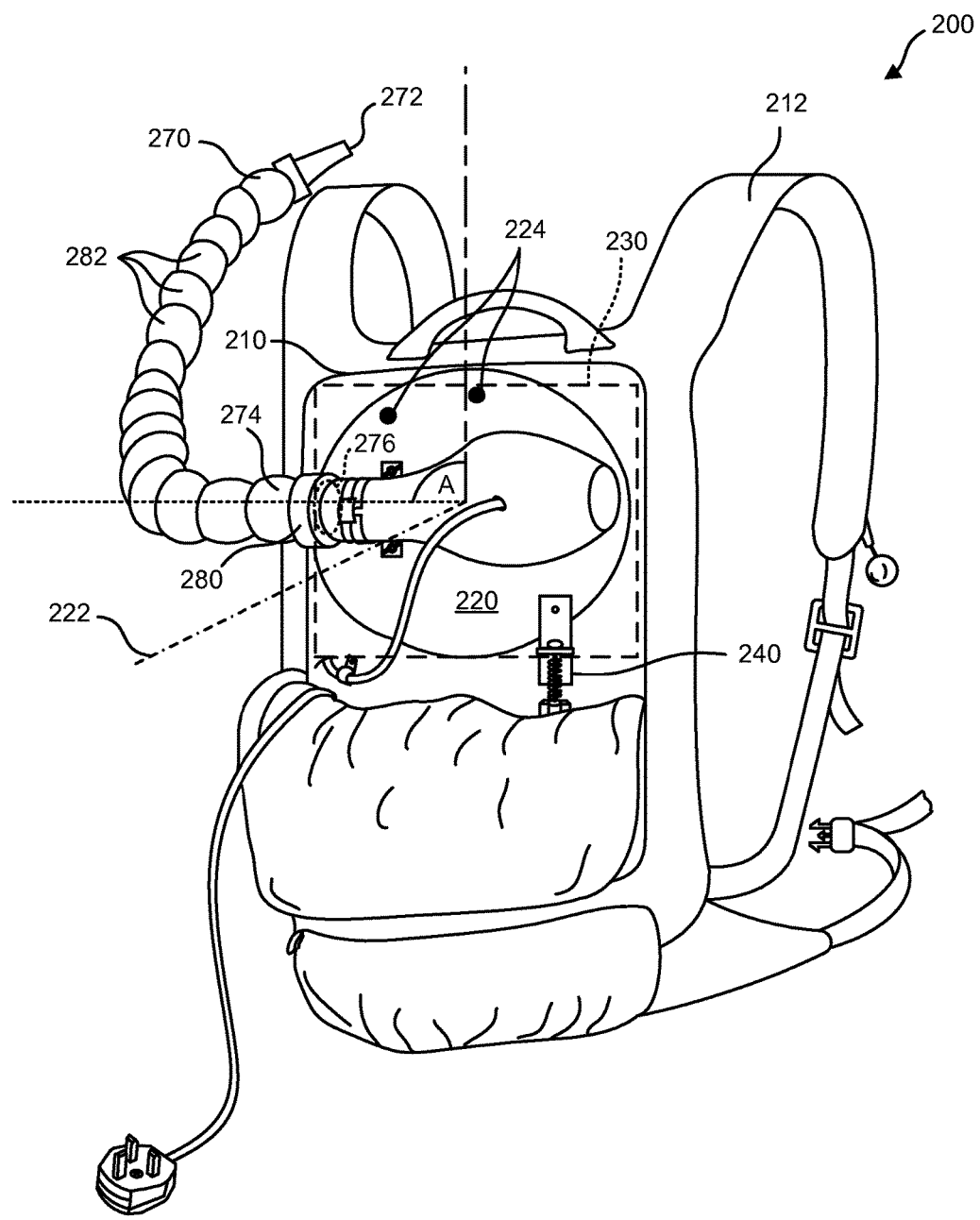
FIG. 2 is a perspective view of the hands-free dryer.
Figure 3:
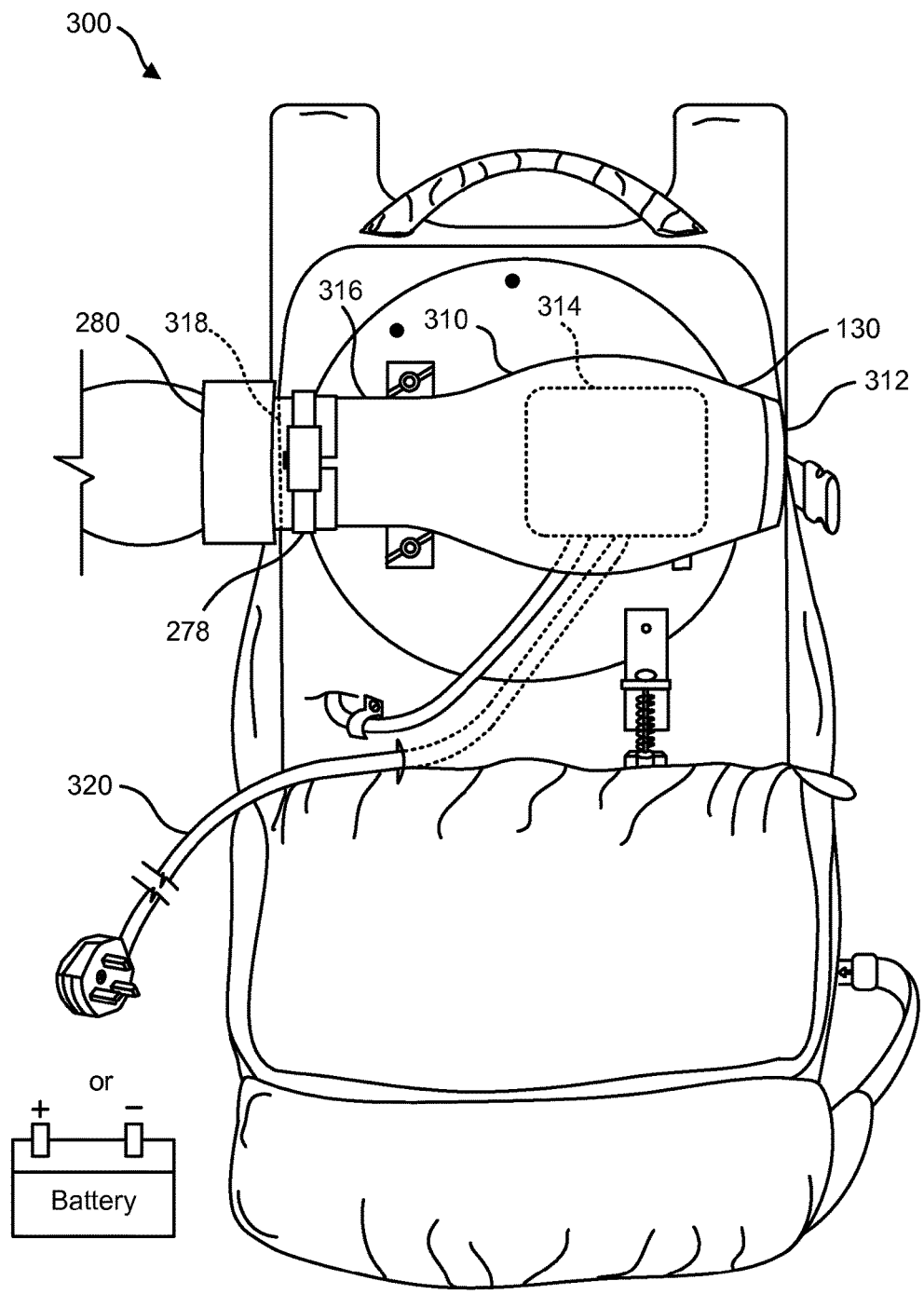
FIG. 3 is a rear elevational view of the hands-free dryer.

FIG. 2 is a perspective view of the hands-free dryer 100. FIG. 3 is a rear elevational view of the hands-free dryer 100. In the implementation of FIGS. 1-4, the support system 110 is similar to a backpack. The support system 110 can include a back section 210 between the orientation system 120 and the user. The back section 210 can be used to mount the orientation system 120 to the support system 110. The back section 210 can be, for example, of flexible, rigid, or reinforced construction. The back section 210 can also include, for example, padding, flocking, etc. (not shown) to provide a good fit and/or comfort to the user while wearing the hands-free dryer 100.

The harness 212 can be used to secure the support system 110 to the user. The harness 212 can include a pair of shoulder straps 410 that go over the shoulders of the user to put the weight of the hands-free dryer 100 on the user's shoulders. The harness 212 is described in additional detail in FIG. 4.

One important feature in making the hands-free dryer 100 be "hands-free" is the orientation system 120. The orientation system 120 can function to point the blower 130 at the angle A such that the semi-rigid, flexible hose 140 can be a) of minimum length, and b) in a place convenient for the user. If the blower 130 was in a fixed position, then, in many situations, hose would have to be longer to reach a particular location on the target at the desired angle. Also, the orientation system 120 allows for the semi-rigid, flexible hose 140 to be predominantly on one side of the user or other, which can be important depending on the handedness of the user. The orientation system 120 can include a mounting plate 230 with a rotating plate 220 connected to the mounting plate 230.

The mounting plate 230 can be attached in a fixed position to the back section 210. The mounting plate 230 is used to provide a firm mechanical connection between to the back section 210 and also to provide additional structure to which other components, described below, can be fastened. The mounting plate 230 can be constructed of, for example, wood, plastic, metal, etc. The mounting plate 230 can be, for example, a flattened disk shaped structure, rectangular, irregular, contain openings, etc. The mounting plate 230 can be of any thickness sufficient to provide a secure mounting of the rotating plate 220.

The rotating plate 220 can be connected to the mounting plate 230 to allow the blower 130, also connected to the rotating plate 220, to rotate relative to the user. The rotating plate 220 can have an axis 222 of rotation normal to the mounting plate 230. When the user is wearing the hands-free dryer 100, for example as shown in FIG. 1, the axis 222 of rotation of the rotating plate 220 will be substantially horizontal, making the rotating plate 220 rotate in a substantially vertical plane. The connection between the rotating plate 220 and the mounting plate 230 can be, for example, a bearing connection, a pin and hole, etc. The blower 130 can be affixed to the rotating plate 220, thus the angle A of the rotating plate 220 can determine the angle of the blower 130. The angle A of the blower 130 can then be adjusted by the user by rotating the blower 130 and the rotating plate 220. The rotating plate 220 can have any angle A, however there can also be index holes 224 that are used by an index locking system 240, described below, to lock the rotating plate 220 and blower 130 at a particular angle. The index holes 224 can allow the semi-rigid, flexible hose 140 to extend naturally under the left arm, over the left shoulder, over the right shoulder, or under the right arm. There can be any number and disposition of additional index holes 224 provided in the rotating plate 220 to allow for other angular positions. Though the rotating plate 220 can be used to rotate the blower 130 and provide the benefits described above, in some implementations, the rotating plate 220 and/or blower 130 can be fixed, with the adjustability of the hands-free dryer 100 stemming from only the semi-rigid, flexible hose 140.

The blower 130 can be used to provide a source of pressurized air flow. The blower 130 can be, for example, a fan, hair dryer, or any type of air-moving apparatus. The blower 130 can have a blower housing 310 with a blower proximal end 312, nearest to a blower mechanism 314 responsible for moving air through the blower 130. The blower 130 can also have a blower distal end 316, opposite the blower proximal end 312. There can be a blower aperture 318 near the blower distal end 316 to provide an opening for air from the blower mechanism 314 to leave the blower housing 310. There can also be a blower intake vent (not shown) to allow air to enter the blower 130 before being moved by the blower mechanism 314. There can be a filter (not shown) to provide filtered air to the blower 130 attached to the proximal end 312 of the blower 130.

The blower 130 can be electrically powered and connected to a power source via a power cable 320. The power source can be a fixed AC or DC source, or a battery. The blower 130 can be operated through blower controls 412 (shown in FIG. 4) that can control turning the blower mechanism 314 on or off. The blower controls 412 can also adjust fan speed, temperature, etc. The blower controls 412 can be integrated into one unit, or be located at separate locations. The blower controls 412 can also be located away from the blower 130, for example, the blower controls 412 can be located on the harness 212, support system 110, or in an external control box, while the blower 130 is located on the back of the user.

To direct the air from the blower 130 to the target, a semi-rigid, flexible hose 140 can be connected to the blower 130. The semi-rigid, flexible hose 140 can extend to reach around the back of the user, and around a body of a user, to terminate at some location along the side of, or in front of, the user as the user faces the target. The blower 130 can have a hose proximal end 270, the hose proximal end 270 being the end of the semi-rigid, flexible hose 140 that is closest to the target. The blower 130 can have a hose distal end 274 connected to the blower 130 and can substantially surround the blower aperture 318 to capture the air coming from the blower 130. The semi-rigid, flexible hose 140 can have a hose distal aperture 276, located at the hose distal end 274, which can allow the air from the blower 130 to enter the hose, and a hose proximal aperture 272, located at the hose proximal end 270, which can allow air to exit the semi-rigid, flexible hose 140 and directed upon the target.

To secure the semi-rigid, flexible hose 140 to the blower 130, a hose fastener 278 can be used. The hose fastener 278 can be, for example, a hose clamp, adhesive, welding, tying with a cable, interlocking tabs and slots, etc. In FIG. 3, the hose fastener 278 is shown as a hose clamp which is used to tighten a hose adaptor 280 to the distal end of the blower 130. The hose adaptor 280 can be used to adapt the hose to be connected to the blower 130, in the event that the diameter of the hose does not readily fit the distal end of the blower 130. The hose adaptor 280 can be attached to the hose distal end 274 by clamps, adhesives, welding, tied cables, interlocking tabs and slots, etc. The hose adaptor 280 can be of such a design as to allow relatively easy attachment and removal of the hose 140 to facilitate portability and transportability.

The semi-rigid, flexible hose 140, while being flexible enough to be oriented in a particular configuration, can also be rigid enough to prevent or resist unwanted changes in the configuration. The semi-rigid, flexible hose 140 then can be of a construction that allows it to support itself, without further control from the user, particularly without the user having to hold the semi-rigid, flexible hose 140 during operation of the hands-free dryer 100. For example, segmented sections 282 of the semi-rigid, flexible hose 140 can mechanically engage to retain the configuration of the semi-rigid, flexible hose 140. The semi-rigid, flexible hose 140 can be a LOC-LINE hose, a STAY-PUT hose, or any type of adjustable, but stationary and self-supporting, hose or tubing.

Figure 4:
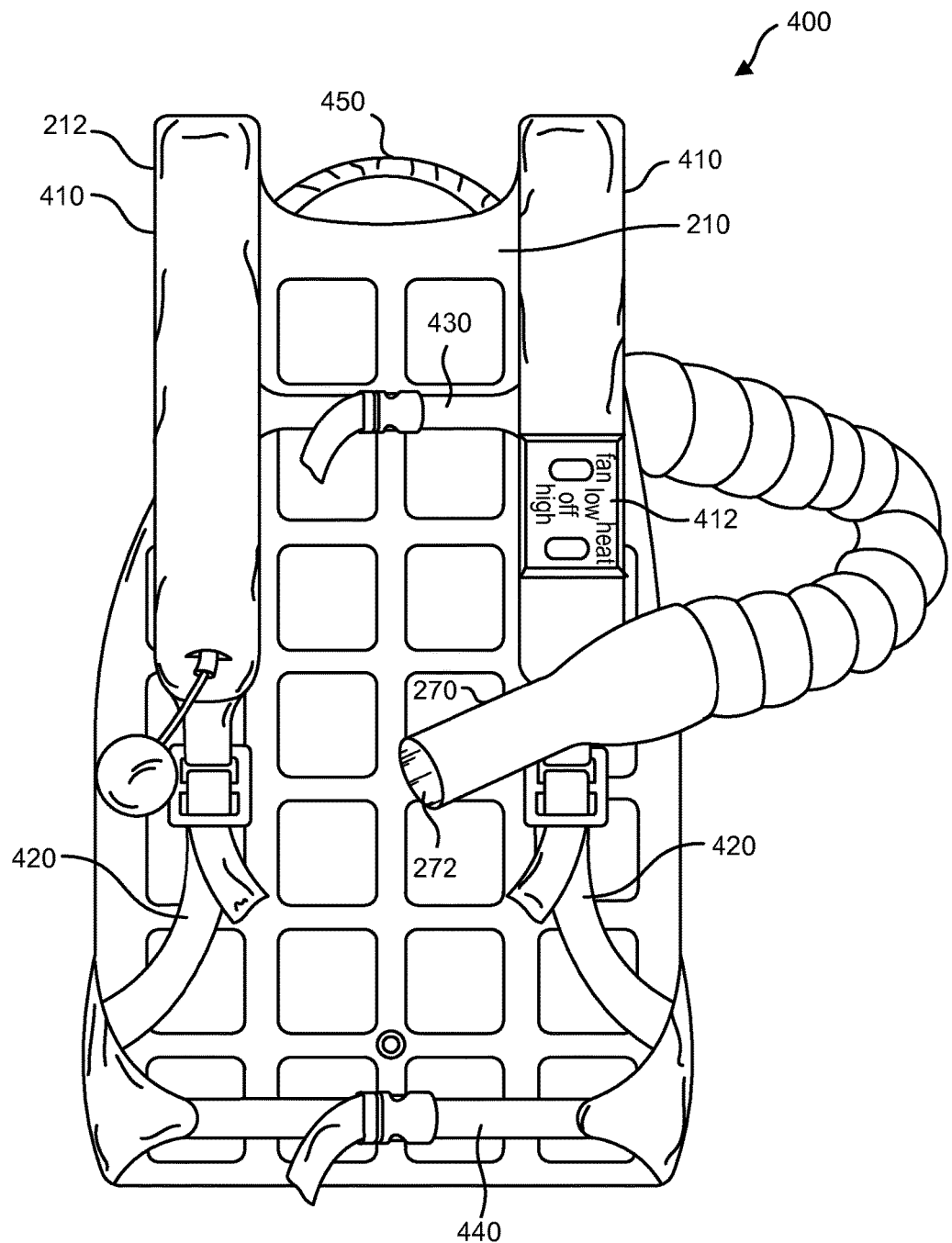
FIG. 4 is a front elevational view of the hands-free dryer.

FIG. 4 is a front elevational view of the hands-free dryer 100. In the implementation of FIGS. 1-4, the hands-free dryer 100 can be worn as part of a backpack strapped to the body of the user. To secure the hands-free dryer 100 to the user, the support system 110 can be worn over the shoulders of the user, supporting the rest of the hands-free dryer 100 on the user's back. A series of straps can be used to further secure the hands-free dryer 100 to the user. This is important as it prevents unwanted shifting or rotation of the hands-free dryer 100, thus keeping the hands-free dryer 100, and particularly the semi-rigid, flexible hose 140, pointing in the direction desired by the user.

The support system 110 can include, in addition to the back section 210 described above, a harness 212 for securing the support system 110 to the user. The harness 212 can include shoulder straps 410, which can have padding, shaping, etc. to comfortably be worn over the shoulders of a user. As mentioned above, the blower controls 412 are shown, in this implementation, to be affixed to one of the shoulder straps 410 where they can be easily reached by a user. Furthermore, there can be a cable proximal end 552 extending from one of the shoulder straps 410 that can be used as part of the orientation system 120. When pulled by the user, this action enables the rotating plate 220 to rotate when adjusting the blower 130. This feature is described in further detail in FIG. 5, below.

To adjust the shoulder straps 410 to the correct size, there can be adjustment straps, connected between the back section 210 and each of the shoulder straps 410. The adjustable straps 420 can use, for example, buckles, snaps, buttons, hooks and loops fasteners, D-rings, etc. to provide an adjustable fitting of the shoulder strap 410s. There can also be a chest strap 430, similar to the adjustable strap 420 that goes across the chest of the user to provide additional securing and resist the separation or slippage of the shoulder straps 410 when worn by the user. There can also be a waist strap 440, similar to the chest strap 430, to prevent the twisting of, and more securely anchor, the hands-free dryer 100 when worn by the user. To aid in donning or doffing of the hands-free dryer 100, or to simply provide a safe and convenient grasping location for carrying the hands-free dryer 100, there can be a carrying strap 450 connected to the back section 210 of the hands-free dryer 100 and shaped to be grasped by the hand of the user.

Figure 5:
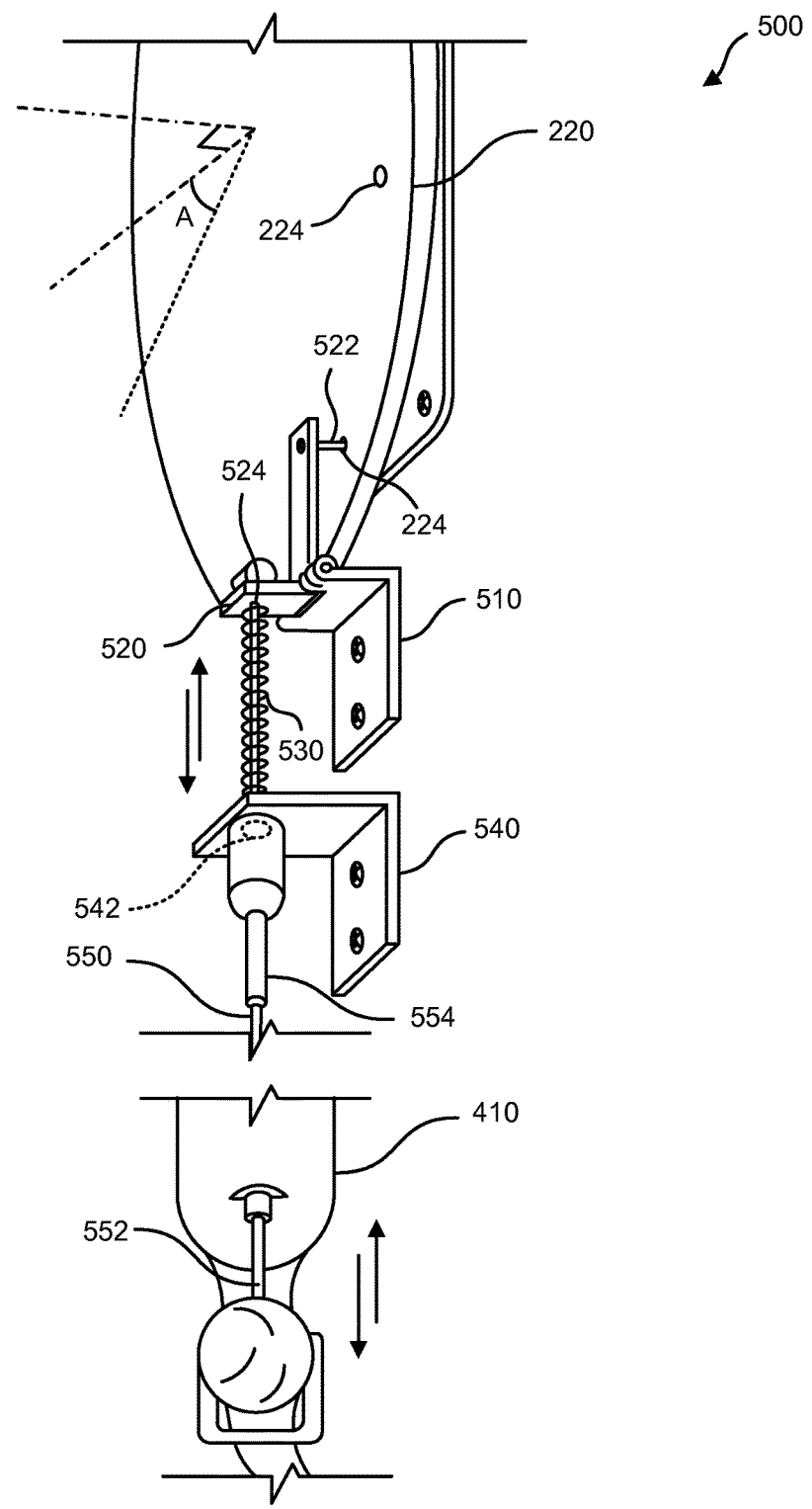
FIG. 5 is a perspective view illustrating an index locking system.

FIG. 5 is a perspective view illustrating an index locking system 240. The index locking system 240 can allow the blower 130 to be locked in a desired orientation when worn on the back of the user. In the implementation shown in FIG. 5, the index locking system 240 can include a fixed bracket 510 connected to the back section 210 pivotally connected to a pivotal bracket 520 having a pivotal bracket aperture 524. The pivoting connection can be, for example, a hinge, bearings, etc. The pivotal bracket 520 can also include an index peg 522 shaped to removably engage the index holes 224 in the rotating plate 220, causing the rotating plate 220 to resist rotation. In line with the fixed bracket 510 and the pivotal bracket 520, there can be a fixed tension bracket 540 with a tension bracket aperture 542 in line with the pivotal bracket aperture 524. The function of the tension bracket 540 is described in further detail below.

A cable 550 can be used to actuate the index locking system 240, resulting in engagement or disengagement of the index locking system 240. The cable 550 can have a cable proximal end 552, closest to the user and illustrated in FIG. 4, and a cable distal end 554 opposite the cable proximal end 552. The cable distal end 554 can be threaded through the tension bracket aperture 542 and the pivotal bracket aperture 524. The cable distal end 554 can be affixed or operatively connected to the pivotal bracket 520 such that by pulling on the cable 550 the cable distal end 554 does not disengage the cable 550 from the pivotal bracket 520.

When the proximal end of the cable 550 is pulled, the pivotal bracket 520 can swing towards the tension bracket 540. The "L" shape of the pivotal bracket 520 can then lift the portion of the pivotal bracket 520 in contact with the plate away from the plate. The index peg 522 connected to the pivotal bracket 520 can disengage from the index hole 224 leaving the rotating plate 220 free to rotate.

A spring 530 can be provided that surrounds the portion of the cable 550 between the pivotal bracket 520 and the tension bracket 540. The spring 530 can provide separating force between the pivotal bracket 520 and the tension bracket 540 to naturally return the pivotal bracket 520 to an engaged state and keep the index peg 522 in the index hole 224, locking the rotating plate 220. The spring 530 can be any form of force providing mechanism, for example a band, a compressible solid object, a torsion spring, etc.

There can be a wide variety of mechanical features which provide substantially similar functions of locking the rotating plate 220 and disengagement to allow rotation. The rotating plate 220 can be motorized and controlled by a user to rotate to a desired location, held in position by gearing mechanisms. A clamp can be used to grasp and hold the rotating plate 220 in a fixed position instead of using the index peg 522 and the index holes 224.

In another implementation there can be a spring loaded plunger mounted on a second fixed bracket that inserts directly into the index holes 224 of the rotating plate 220.

In yet another implementation, there can be a spring loaded blade mounted on a third fixed bracket that inserts, substantially radially, into indexing slots formed into the rotating plate 220.

In a further implementation, there can be a clamping brake that holds the rotating plate 220 in a default brake-on position and can be released by the user to adjust the position of the of the rotating plate 220

In another implementation, there can be a worm drive that meshes into teeth formed into the rotating plate 220. The worm drive can be controlled by a user and can be, for example, motor driven, turn cable operated, etc.

In another implementation, there can be a cueing and aiming system that will control the hose proximal end 270 and/or the hose proximal aperture 272, with autonomic response to the user's eye and/or head position.

In a further implementation, there can be a family of hands-free drying systems based on similar architecture. For example, there can be a fixed rig for a specific work station in a shop. A more powerful blower can mounted on a swiveling gantry attached to the ceiling or tall stand above the target. An unrestricted flexible hose can be connected to a long swivel arm above the user which then hangs down and plugs into the indexed rotating plate of the back pack system in place of the blower 130.

In some implementations, the hands-free dryer 100 requires 110 v-120 v, 50 Hz-60 Hz support at remotes sites as described in this document, whereas in other implementations, there can be a self-supporting, battery-operated hands-free dryer 100.

In another implementation, the semi-rigid, flexible hose 140 can have a significantly greater articulating range that allows a fixed position mount for the blower in a vertical position for an over-the-shoulder or under-the-arm configuration. In this implementation, there can be any desired position for the hose proximal aperture 272 obviating the need for the rotating plate 220.

In another implementation, an illumination source can be attached to the hose proximal aperture 272 in order to directly illuminate the target work area with switch controls on the control box 412. The hose proximal aperture 272 can be adjustable to either focus or diffuse the air flow on the target area.

In further implementation, the 3-position switches on the control box 412 can be replaced with continuously variable rotating pot switches. The analog switches on the control box 412 can be replaced with digital controls for all blower functions. Also, there can be thermostatically controlled heat to provide precise temperature control of air delivered to the target.

In another implementation, there can be magnets connected to the mounting plate 230 and to the support plate. One of the magnets can be a locking magnet and the other magnets can be indexing magnets. This is analogous to the index peg 522 and the index holes 224. The polarity of the index magnets and the locking magnets are oriented such that the attractive force between the index magnet and one of the locking magnets when the index magnet and the corresponding locking magnet are within closest proximity. In this way, the index magnet and the closest locking magnet would resist the rotation of the rotating plate 220 away from that position, thus locking the rotating plate 220 in place.

The present application also includes a method for drying the target while allowing the hands of the user to not be controlling the operation of the hands-free dryer 100. The user can don the hands-free dryer 100, via the above-described harness 212 and support system 110. The blower 130 can be oriented in the desired position. The semi-rigid flexible hose 140 can be configured to point to the target. The flexible hose 140 can be released by the user to leave the semi-rigid flexible hose 140 self-supported in the configuration during the operation of the hands-free dryer 100. The blower 130 can be powered to provide directed air flow to the target through the semi-rigid flexible hose 140 and without the user's hands controlling the semi-rigid flexible hose 140.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A hands-free dryer for drying a target while allowing hands of a user to not be controlling the operation of the hands-free dryer, the hands-free dryer comprising:
   a blower configured to selectively provide air flow;
   a semi-rigid flexible hose operatively connected to the blower, the semi-rigid flexible hose retaining a configuration of the semi-rigid flexible hose without the hands of the user maintaining the configuration; and
   a support system operatively connected to the blower, the support system configured to be worn by the user such that when the user is standing, an angle of the blower is adjustable only in a substantially vertical plane.

2. The hands-free dryer of claim 1, further comprising an orientation system comprising:
   a mounting plate fixedly mounted to the support system; and
   a rotating plate operatively connected to the mounting plate to allow the rotating plate to rotate along an axis normal to the mounting plate,
   wherein the blower is fixedly mounted to the rotating plate,
   wherein the angle is adjustable by a user by rotating the blower about the axis via the orientation system.

3. The hands-free dryer of claim 2, the orientation system further comprising:
   an index locking system comprising:
      a fixed bracket having a fixed bracket aperture;
      a pivotal bracket operatively connected to the fixed bracket configured to pivot relative to the fixed bracket, the pivotal bracket having an index peg shaped to be removably insertable into an index hole in the rotating plate, wherein the rotating plate will not rotate while the index peg is inserted into the index hole;
      a tension bracket mounted to the support system, the tension bracket having a tension bracket aperture;
      a cable having a cable proximal end and a cable distal end, the cable distal end operatively connected to the pivotal bracket and extending through pivotal bracket aperture and the tension bracket aperture; and
      a spring surrounding the cable between the tension bracket and the pivotal bracket, wherein pulling on the proximal cable end causes compression of the spring and pivoting of the pivotal bracket, removing the index peg from the index hole and allowing the rotating plate to rotate.

4. The hands-free dryer of claim 2, wherein the rotating plate comprises a plurality of index holes;
   wherein:
      when the support system is configured to be worn by the user and the rotating plate is oriented in a substantially vertical direction such that the axis is substantially horizontal, the index holes allow the angle of the rotating plate and blower to cause a blower/semi-rigid flexible hose combination to point under the left arm, over the left shoulder, over the right shoulder, or under the right arm.

5. The hands-free dryer of claim 1, the support system comprising:
   a back section abutting a back of the user when the support system is worn by the user; and
   a harness connected to the back section, the harness comprising:
      a pair of shoulder straps; and
      a pair of adjustable straps operatively connected between the shoulder straps and the back section to adjust the shoulder straps when worn by the user.

6. The hands-free dryer of claim 5, the support system further comprising:
   a chest strap operatively connected between the shoulder straps configured to adjust the shoulder straps when worn by the user;
   a waist strap operatively connected to the back section configured to secure the support system to the user; and
   a carrying strap connected to the back section.

7. The hands-free dryer of claim 1, the blower comprising:
   a blower housing having a blower proximal end and a blower distal end, the blower proximal end proximate to a blower mechanism located substantially within the blower housing, the blower distal end opposite the blower proximal end;
   a blower aperture located at the blower distal end, the blower aperture providing an opening for air from the blower mechanism to leave the blower housing;
   a power cable operatively connected to the blower mechanism configured to provide power to operate the blower mechanism; and
   blower controls operatively connected to the blower mechanism configured to allow a user to operate the blower mechanism, wherein the blower controls are located on the support system.

8. The hands-free dryer of claim 1, the semi-rigid flexible hose comprising:
- a hose proximal end;
- a hose distal end opposite the hose proximal end;
- a hose proximal aperture located in the hose proximal end and operatively connected to the blower to accept air flow from the blower into the semi-rigid flexible hose; and
- a hose distal aperture located in the hose distal end to provide air flow from the blower to the target;
- a hose fastener at the hose proximal end to securely connect the hose proximal end to the blower; and
- a plurality of interlocking segmented sections, the segmented sections retaining the configuration of the semi-rigid flexible hose.

9. A method for drying a target while allowing hands of a user to not be controlling the operation of a hands-free dryer, the method comprising:
- wearing, by a user, of the hands-free dryer, the hands-free dryer comprising:
  - a blower configured to selectively provide air flow;
  - a semi-rigid flexible hose operatively connected to the blower, the semi-rigid flexible hose retaining a configuration of the semi-rigid flexible hose without the hands of the user maintaining the configuration; and
  - a support system operatively connected to the blower, the support system configured to be worn by the user such that when the user is standing, an angle of the blower is adjustable only in a substantially vertical plane;
- orienting, using an orientation system, the blower to a desired position;
- configuring, using the orientation system, the semi-rigid flexible hose to point to a target;
- releasing the semi-rigid flexible hose to leave the semi-rigid flexible hose self-supporting during operation of the hands-free dryer; and
- powering the hands-free dryer to provide directed air flow to the target through the semi-rigid flexible hose and without the user's hands controlling the semi-rigid flexible hose.

10. The hands-free dryer of claim 2, wherein the rotating plate and the mounting plate are configured to mechanically engage at a mechanical engagement point and lock the blower at the angle.

11. The hands-free dryer of claim 10, further comprising a plurality of mechanical engagement points that define a plurality of angles at which the mounting plate and the rotating plate allow engagement to lock the rotating plate at one of the plurality of angles.

12. The hands-free dryer of claim 11, wherein when the support system is configured to be worn by the user and the rotating plate is oriented in a substantially vertical direction such that the axis is substantially horizontal, the plurality of angles allow the blower and the semi-rigid flexible hose to point in at least one of: under the left arm, over the left shoulder, over the right shoulder, or under the right arm.

* * * * *